US007630780B2

(12) United States Patent
Marc

(10) Patent No.: US 7,630,780 B2
(45) Date of Patent: Dec. 8, 2009

(54) FREQUENCY EXPANSION FOR SYNTHESIZER

(75) Inventor: Ihle Marc, Ulm (DE)

(73) Assignee: Palm, Inc., Sunnyvale, CA (US)

( * ) Notice: Subject to any disclaimer, the term of this patent is extended or adjusted under 35 U.S.C. 154(b) by 786 days.

(21) Appl. No.: 10/832,751

(22) Filed: Apr. 27, 2004

(65) Prior Publication Data

US 2004/0259601 A1 Dec. 23, 2004

(30) Foreign Application Priority Data

May 27, 2003 (DE) ................................ 103 24 046

(51) Int. Cl.
*G06F 17/00* (2006.01)

(52) U.S. Cl. .......................................... 700/94; 381/61

(58) Field of Classification Search .................. 700/94; 704/500; 381/61, 98, 101
See application file for complete search history.

(56) References Cited

U.S. PATENT DOCUMENTS

| | | | | |
|---|---|---|---|---|
| 4,700,390 | A | 10/1987 | Machida | |
| 5,018,429 | A | 5/1991 | Yamaya et al. | |
| 5,455,888 | A | 10/1995 | Iyengar et al. | |
| 5,982,305 | A * | 11/1999 | Taylor | 341/61 |
| 2003/0044024 | A1* | 3/2003 | Aarts et al. | 381/61 |
| 2003/0187663 | A1 | 10/2003 | Truman et al. | |
| 2005/0117756 | A1* | 6/2005 | Shigyo et al. | 381/98 |

FOREIGN PATENT DOCUMENTS

| | | |
|---|---|---|
| DE | 4026476 | 3/1992 |
| DE | 3853563 T | 8/1995 |
| DE | 10138225 | 2/2003 |
| EP | 0930704 | 7/1999 |
| EP | 1 047 045 | 10/2000 |
| JP | 9034496 | 2/1997 |
| WO | WO 01/39370 | 5/2001 |
| WO | WO 01/61687 | 8/2001 |

OTHER PUBLICATIONS

Shigyo et al., WO 03/019533 A1 (filed Aug. 24, 2001) (published Mar. 6, 2003).*
Patent Abstracts of Japan 06012079 A—Jan. 21, 1994.
Patent Abstracts of Japan 2001265350 A—Sep. 28, 2001.
XP-000854539—Schnitzler, "A 13.0 KBIT/S Wideband Speech Codec Based on SB-ACELP", pp. 157-160.
Zolzer, Digitale Audiosignalverarbeitung/von Udo Zolzer, Stuttgart, Teubner 1996 ISBN 3-519-06180-5 pp. 230-232.

* cited by examiner

*Primary Examiner*—Walter F Briney, III
(74) *Attorney, Agent, or Firm*—K&L Gates LLP

(57) ABSTRACT

A method is provided for generating synthetic audio signals with a synthesizer by generating a synthesizer output signal with a low sampling rate of the synthesizer. Because of the low sampling rate, missing high-frequency components of the synthesizer output signal are generated by adding a high-frequency signal. An amplitude-modulated high-frequency signal is preferred, and the amplitude-modulated signal S and synthesizer output signal are converted to a higher sampling rate.

17 Claims, 2 Drawing Sheets

FREQUENCY EXPANSION FOR SYNTHESIZER

BACKGROUND OF THE INVENTION

The present invention relates to a method for generating synthetic audio signals through the use of a synthesizer.

Methods of this kind are mainly used in mobile terminals, such as third generation mobile radio terminals, to generate ring tones.

For the generation of synthetic audio signals with the aid of a music synthesizer embodied in software, the computing expense required is approximately proportional to the sampling rate of the output signal. Because of the Nyquist condition, the output signal may contain frequencies only up to half the sampling rate. If, however, the sampling rate is reduced to lower the computing power required, high-frequency signal components are no longer reproduced. In this case, the signal sounds unnatural and muffled.

If a synthesizer of this kind is used, for example, to generate ring tones in mobile telephones, the reduction in the sampling frequency also has the effect of reducing the perceived loudness of the ring melody and, thus, of reducing the signal effect.

Because very inexpensive processors are used for synthesizers in the consumer field (e.g., mobile telephones, electronic games) to save costs, the available computing power is always very scarce. Expensive processors with very high computing power are used for high performance synthesizers. Such processors are both too expensive and too large, and also require too much current, for mobile telephones and electronic games.

Mobile telephones, for example, use special integrated circuits (ICs) (for example, MA-2 from Yamaha), that require a minimum current and chip area at a relatively high sampling rate. Such ICs are expensive and require additional space on an associated circuit board. There is also the cost of production and testing.

For many mobile telephones, the number of tones that can be played simultaneously is reduced in order to lower the computing power required. The disadvantage of this however is that it is not possible to reproduce complex melodies because not all the tones to be played can be reproduced at the same time.

An object of the present invention is, therefore, to provide a method for generating synthetic audio signals through the use of a synthesizer, thus enabling the computing power required to be minimized with, at the same time, sound of the synthesizer being impaired as little as possible.

SUMMARY OF THE INVENTION

With the method in accordance with the present invention for generating synthetic audio signals via a synthesizer, a synthesizer output signal with a low synthesizer sampling rate is generated. Because of the low sampling rate, missing high-frequency components of the synthesizer output signal are generated by adding a high-frequency signal. The low sampling rate preferably is 16 kHz.

In an embodiment of the present invention, the amplitude of the high-frequency signal is modulated. The modulation preferably takes place at a low sampling rate F1; particularly, 16 kHz.

In a further embodiment, the amplitude-modulated signal and the synthesizer output signal are converted to a higher sampling rate F2; particularly, to 32 kHz.

Further preferred is a common sampling rate conversion for the conversion to the higher sampling rate F2. In this case, the synthesizer output signal is simultaneously converted to frequencies from 0 Hz up to the Nyquist frequency of the low sampling rate F1, and the amplitude-modulated signal is converted to frequencies from the Nyquist frequency of the low sampling rate F1 up to the Nyquist frequency of the higher sampling rate F2. The common sampling rate conversion requires distinctly less computing power than a separate conversion. Furthermore, the filter coefficients of the required anti-image filter are derived from the same stored coefficient. Such procedure saves additional memory space.

Also preferred is that the high-frequency signal be a noise signal and calculated with a low sample rate. The calculation preferably takes place at 16 kHz. The noise signal can be generated via a noise generator. Alternatively, the high-frequency signal may be a single tone; in particular, a sinusoidal signal. The calculation of the required amplitude of the noise signal also may take place at 16 kHz.

In a further embodiment of the present invention, the power of the high-frequency components present in the synthesizer output signal is measured. Such measurement preferably takes place in the 4 kHz to 8 kHz range. The power can be used to calculate the volume of the high-frequency signal.

The present invention also relates to a mobile terminal that is suitable for using a method in accordance with the present invention. The mobile terminal can, for example, be a mobile telephone, a personal digital assistant (PDA), an electronic game device or similar.

The present invention makes use of the knowledge that human hearing finds it difficult to distinguish between high-frequency sounds and high-frequency noise.

Pursuant to the method in accordance with the present invention, the sound quality of a synthesizer, particularly a music synthesizer, can be increased with a low sampling frequency. If the signal of the synthesizer is, for example, used as a ring melody of a mobile telephone, the signal effect is clearly increased. Such signal also is clearly audible in a loud environment or when the speaker is covered (e.g., a mobile phone in a pocket).

The above-described method only slightly increases the computing power required, without the number of tones that can be simultaneously reproduced having to be reduced. The computing power required for expanding the frequency range is independent of the number of tones that can be simultaneously reproduced. As such, the method is particularly advantageous if many tones have to be reproduced simultaneously. This is an important market requirement for modem mobile telephones.

Additional features and advantages of the present invention are described in, and will be apparent from, the following Detailed Description of the Invention and the Figures.

DETAILED DESCRIPTION OF THE INVENTION

Figure 1:
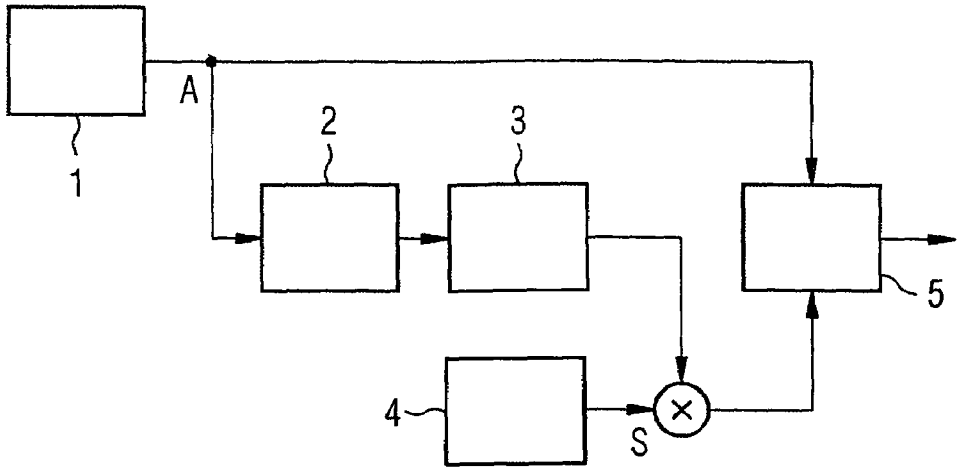
FIG. 1 shows an example of an embodiment of a complete synthesizer system.

FIG. 1 shows a synthesizer 1 that generates a synthesizer output signal A. The signal is filtered by a high-pass filter 2. The power of the signal is then estimated with the aid of a power estimating part 3.

Figure 2:
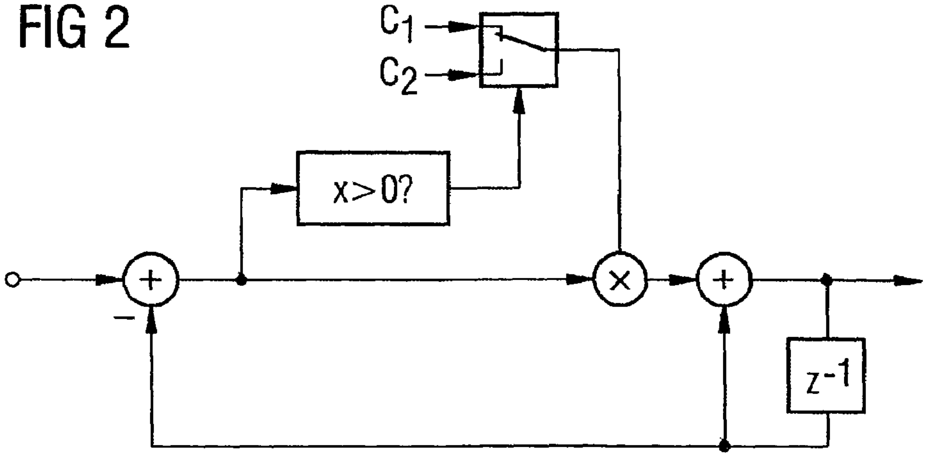
FIG. 2 shows a recursive filter for use in the complete system.

FIG. 2 shows an embodiment of the power estimation part. The estimation takes place with the aid of a recursive filter by rectifying the input signal and filtering. In doing so, the output signal of the preceding calculation is subtracted from the input signal, as shown by block z-1. If the calculated value is positive (x>0), the constant c1 is used to filter the signal. If the condition x>0 is not met, constant c2 is used. By switching the constants, the filter reacts more quickly to increasing input power than to reducing input power.

FIG. 1 also shows how the amplitude of the output signal of the power estimation part 3 is modulated (i.e., multiplied), by the output signal of a noise generator 4.

Figure 3:
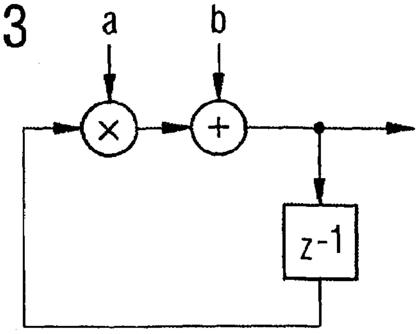
FIG. 3 shows a noise generator for use in the complete system.

FIG. 3 shows an embodiment of the noise generator 4 as a pseudo-noise generator. The output signal of the preceding calculation (shown by block z-1) is, in this case, multiplied by a value a and then added to a value b.

FIG. 1 shows how the sampling rate of the signals A of synthesizer 1 and noise generator 4 (after amplitude modulation) is then increased by a factor of 2. This takes place in a sampling converter 5.

Figure 4:
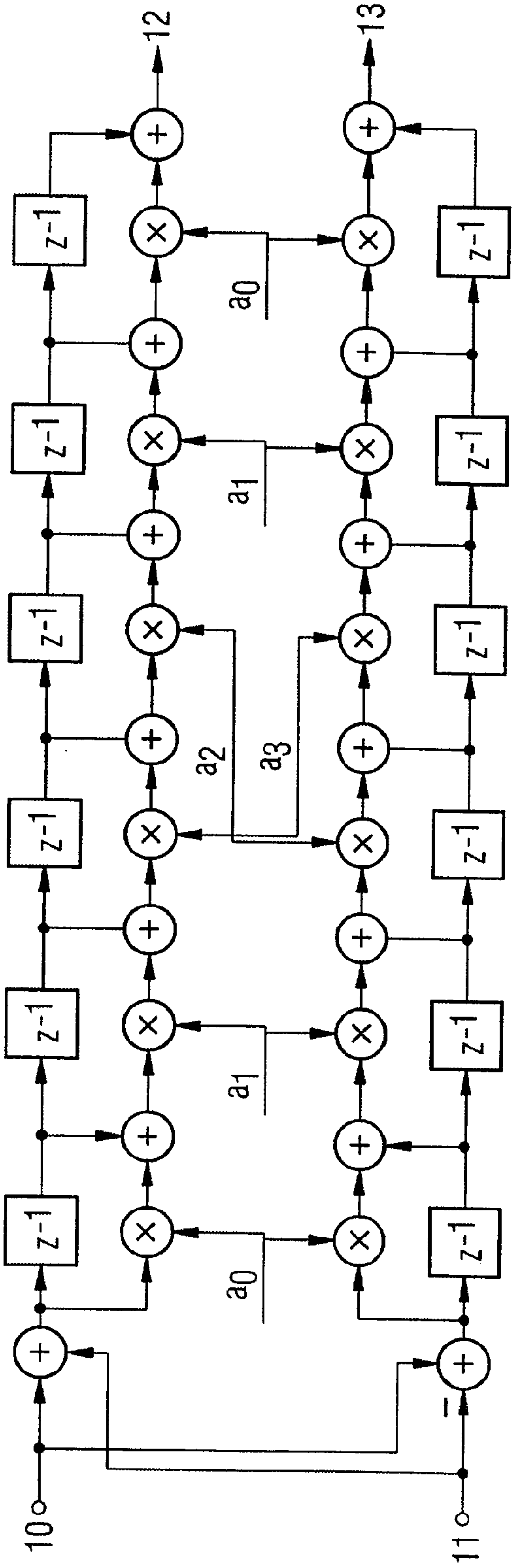
FIG. 4 shows a combined sampling converter for use in the complete system.

FIG. 4 shows in detail an embodiment of the sampling rate converter for combined scanning rate conversion. For this purpose, the signals of synthesizer 10 and noise generator 11 are added and applied to an FIR (Finite Input Response) filter and then subtracted (synthesizer signal—noise signal), and applied to a second FIR filter. Both FIR filters use the same filter coefficients (a0, a1), but the middle coefficients (a2, a3) are exchanged for the second FIR filter. Both output signals of the two FIR filters are used alternately as an output signal, which results in an increase in the sampling rate by a factor of two.

The synthesizer signal is, in this case, fed to both FIR filters without a change in the sign. Together, such FIR filters form a polyphase filter to convert the sampling rate by a factor of 2. The noise signal is fed in to the top FIR filter with an unchanged sign and to the lower FIR filter with an inverted sign. Because the output signals of both FIR filters are used alternately, a modulation of the noise signal with the Nyquist frequency of the output sampling rate results. As such, the noise signal is mirrored in the upper frequency range.

Although the present invention has been described with reference to specific embodiments, those of skill in the art will recognize that changes may be made thereto without departing from the spirit and scope of the present invention as set forth in the hereafter appended claims.

The invention claimed is:

1. A method for generating synthetic audio signals, the method comprising:

providing a synthesizer for generating a synthesizer output signal with a low sampling rate of the synthesizer;

generating missing high frequency components of the synthesizer output signal, due to the low sampling rate, by adding a high-frequency signal, wherein modulating an amplitude of the high-frequency signal; and converting the amplitude-modulated signal and the synthesizer output signal to a respectively higher sampling rate, wherein a common sampling rate conversion is used for conversation to the high sampling rate, with the synthesizer output signal being simultaneously converted to frequencies from 0 Hz up to a Nyquist frequency of the low sampling rate, and the amplitude-modulated signal is converted to frequencies from the Nyquist frequency of the low sampling rate up to the Nyquist frequency of the high sampling rate.

2. A method for generating synthetic audio signals as claimed in claim 1, wherein the low sampling rate is 16 kHz.

3. A method for generating synthetic audio signals as claimed in claim 1, wherein the amplitude modulation occurs at a low sampling rate.

4. A. method for generating synthetic audio signals as claimed in claim 3, wherein the low sampling rate is 16 kHz.

5. A method for generating synthetic audio signals as claimed in claim 1, wherein the high sampling rate is 32 kHz.

6. A method for generating synthetic audio signals as claimed in claim 1, wherein the high-frequency signal is noise.

7. A method for generating synthetic audio signals as claimed in claim 1, wherein the high-frequency signal is calculated at a low sampling rate.

8. A method for generating synthetic audio signals as claimed in claim 7, wherein the low sampling rate is 16 kHz.

9. A method for generating synthetic audio signals as claimed in claim 1, wherein the high-frequency signal is one of a sound mixture and a single sound.

10. A method for generating synthetic audio signals as claimed in claim 1, wherein the high-frequency signal is a sinusoidal signal.

11. A method for generating synthetic audio signals as claimed in claim 1, further comprising measuring a power of the high-frequency components present in the synthesizer output signal.

12. A method for generating synthetic audio signals as claimed in claim 11, wherein the power of the high-frequency components is in a range from 4 kHz and 8 kHz.

13. A method for generating synthetic audio signals as claimed in claim 11, wherein the power of the high-frequency components is used for calculating an amplitude of the high-frequency signal.

14. A method for generating synthetic audio signals as claimed in claim 1, wherein the method is employed in a mobile terminal.

15. A method for generating synthetic audio signals as claimed in claim 14, wherein the mobile terminal is a mobile telephone.

16. A system for generating synthetic audio signals, the comprising:

a synthesizer for generating a synthesizer output signal with a low sampling rate of the synthesizer, wherein missing high frequency components of the synthesizer output signal are generated, due to the low sampling rate, by adding a high-frequency signal, an amplitude of the high-frequency signal is modulated, and the amplitude-modulated signal and the synthesizer output signal are converted to a respectively higher sampling rate, wherein a common sampling rate conversion is used for conversation to the high sampling rate, with the synthesizer output signal being simultaneously converted to frequencies from 0 Hz up to a Nyquist frequency of the low sampling rate, and the amplitude-modulated signal is converted to frequencies from the Nyquist frequency of the low sampling rate up to the Nyquist frequency of the high sampling rate.

17. A mobile device with an apparatus for generating synthetic audio signals, the apparatus comprising:

a synthesizer for generating a synthesizer output signal with a low sampling rate of the synthesizer, and generating missing high frequency components of the synthesizer output signal, due to the low sampling rate, by adding a high-frequency signal; and a modulator to modulate an amplitude of the high-frequency signal to produce an amplitude-modulated signal, wherein a common sampling rate conversion is used for conversion to a high sampling rate, with the synthesizer output signal being simultaneously converted to frequencies from 0 Hz up to a Nyquist frequency of the low sampling rate, and the amplitude-modulated signal is converted to frequencies from the Nyquist frequency of the low sampling rate up to a Nyquist frequency of the high sampling rate.

* * * * *